United States Patent [19]
Fossum et al.

[11] 4,144,447
[45] Mar. 13, 1979

[54] INTERVAL TIMER

[75] Inventors: Bryce G. Fossum, Rochester; Kenneth J. Markson, Mazeppa; Phillip C. Schloss, Rochester; James W. Wing, Zumbro Falls, all of Minn.

[73] Assignee: International Business Machines Corporation, Armonk, N.Y.

[21] Appl. No.: 786,918

[22] Filed: Apr. 12, 1977

[51] Int. Cl.² ............................................. G06M 3/02
[52] U.S. Cl. .............................. 235/92 PE; 235/92 T; 235/92 CM; 235/92 DP; 235/92 R; 328/48
[58] Field of Search ............ 235/92 PE, 92 T, 92 CT, 235/92 DP, 92 CM; 328/48

[56] References Cited
U.S. PATENT DOCUMENTS

| | | | |
|---|---|---|---|
| 3,728,635 | 4/1973 | Eisenberg | 235/92 PE |
| 3,962,565 | 6/1976 | Guyen-Phuoc | 235/92 PE |
| 4,005,571 | 2/1977 | Wolff | 235/92 PE |
| 4,016,407 | 4/1977 | Mesecar | 235/92 CT |

Primary Examiner—Joseph M. Thesz
Attorney, Agent, or Firm—Robert W. Lahtinen

[57] ABSTRACT

A device control circuit is disclosed which includes the provision of control commands at precise time intervals by gating each command at a time controlled by a continuously running counter to which is added the next event delay value. Upon reaching a predetermined fixed value the next event gating signal is generated. The delay value may be entered at any time prior to the elaspe of the delay time and all gating signals are accurately time related with regard to a fixed reference and to one another.

8 Claims, 3 Drawing Figures

INTERVAL TIMER

FIELD OF THE INVENTION

The present invention relates to device control circuits and more particularly to device control circuits including time delays between control signals.

BACKGROUND OF THE INVENTION

It is often necessary for a data processing system to control devices by sending signals which control events at discrete times following varying delay periods. One example is a printer where various functions such as paper drive or print head movement are controlled by stepper motors. Such motors require signals to change the electrical charge from one winding or set of windings to another winding or set of windings. The signals must occur at precise times if an efficient, smooth movement is to be accomplished. In addition while acceleration of the move is ocurring the time delays between pulses must be continuously diminishing and during deceleration the time delays must be a series of properly increasing time periods to effect a slowing of the motion to a detented stop. Very precise timings are necessary for efficient operation and are vital in an open loop system where improper action resulting from the signal or command would not be immediately known to the device.

It has been common in the prior art to provide a delay counter which is loaded with a value and a signal generated when the count is achieved. Where the control sequence requires a succession of interrelated delays, that may be either the same or varying in duration, the loading of the delay counter must occur before the next pulse is received which will increment or decrement the counter. Failure to load the counter prior to this occurrence will induce an error that is likely to cause irregular operation of the controlled device if not a completely false or improper action.

SUMMARY OF THE INVENTION

In the device of the present invention, which is used to control a sequence of delay times, a continuous running counter is utilized to which a count value is algebraically added with the output signal occurring when the counter has achieved a fixed value. This mode of operation has several advantages. Since the counter runs continuously, all timed events occur with respect to a fixed time reference so that all timed durations are accurate intervals with respect to one another and any fixed time such as a starting time. There is also no lost time at the start of a period induced by a delay in loading the value. Further the value of the next delay may be added to the count, between successive count pulses, at any time prior to the expiration of the delay period to be introduced. This factor keeps the time of loading the next event from being critical and permits the device which affects the gating of the next event time delay count to be subject to fewer demands. This enables the use of a slower device or circuit or in the alternative enables more devices to be controlled by the same equipment.

It is an object of this invention to provide an improved means for controlling the generation of a sequence of signals separated by predetermined delay times. It is also an object of this invention to utilize a continuously running counter to generate a sequence of time delayed signals that are accurately interrelated with respect to one another and with respect to a reference time. It is a further object of this invention to provide means for the generation of signals separated by discrete and variable time periods which requires reduced monitoring by the associated processing and control apparatus.

BRIEF DESCRIPTION OF THE DRAWINGS

These and other objects and advantages as well as a more thorough understanding of the construction and mode of operation of this invention may be attained from the following description taken in connection with the following drawings in which.

DETAILED DESCRIPTION

Figure 1:
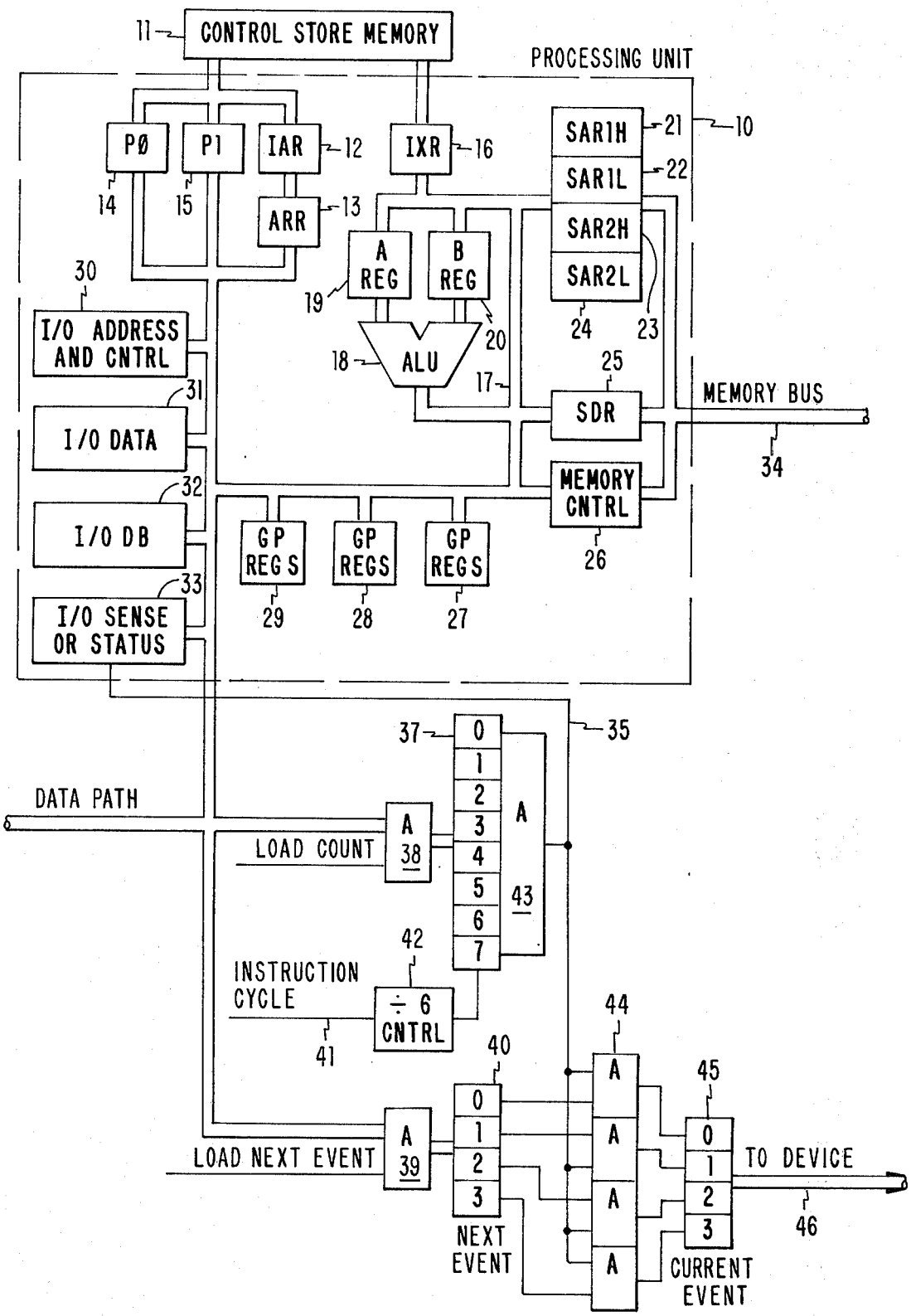
FIG. 1 shows the control apparatus of the present invention in conjunction with the significant portions of the associated processing unit.

FIG. 1 shows the time delay control circuitry of this invention in conjunction with a processing unit 10. The processing unit includes addressing means for accessing an external control store memory 11 which contains an instruction address register 12, to which is connected an address recall register 13 and a pair of page registers 14 and 15. An address from the combined outputs of instruction address register 12 and one of the page registers 14 and 15 is transmitted to control store memory 11 causing a selected instruction to be loaded into the instruction execution register 16 which is then decoded and placed on data path 17. The common data path 17 also has connected thereto an arithmatic and logic unit 18 and its associated input registers 19 and 20; a series of registers 21 through 26 operable to access a data store memory (not shown) on bus 34; a series of general purpose registers 27 through 29 and a series of registers 30 through 33 used with regard to input/output devices. The data path 17 is 8 bits wide and the memory bus 34 is of a 33 bit width including 16 bits of address from either the combination of storage address register 1 high 21 and storage address register 1 low 22 or storage address register 2 high 23 and storage address register 2 low 24; the 8 bits from storage data register 25 and 8 bits from memory control register 26. The remaining bit is a parity bit.

The 4 registers associated with input/output control are I/O address and control register 30, I/O data register 31, I/O data register B 32 and I/O sense or status register 33. One bit of the 8 bit I/O sense or status register 33, referred to as the next event sense bit, is utilized with the next event timer circuitry. Line 35 is connected to this bit such that the bit is set on by an output signal on line 35.

Figure 2:
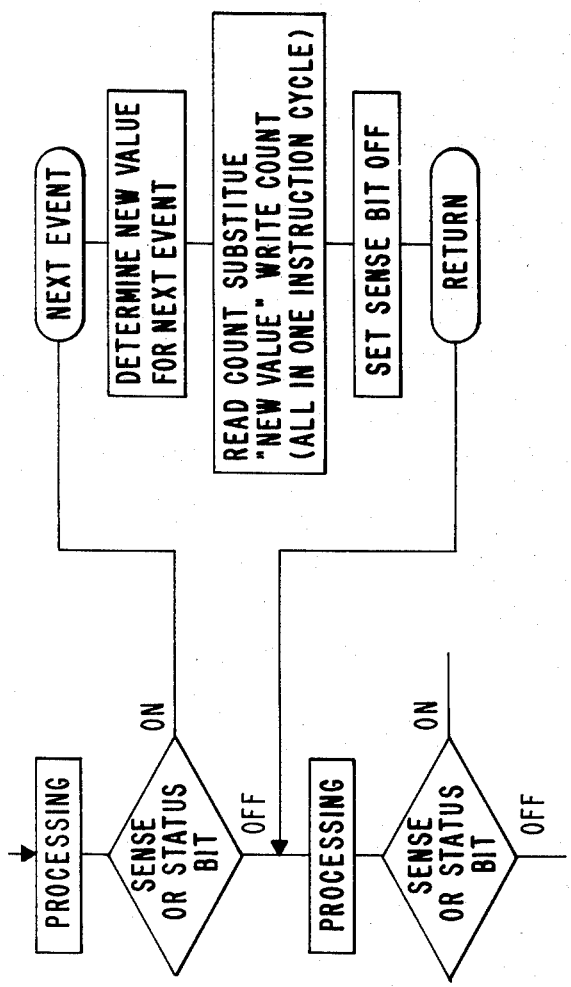
FIG. 2 is a brief portion of a flow chart showing the steps involved in performing the time delay control as practiced by the apparatus of FIG. 1

Referring to FIG. 2, the processing sequence in its cycle periodically monitors or scans the I/O sense or status register 33 to determine whether any bit is on to thereby indicate a requirement to service some device. Considering only the next event sense bit, if the bit is found to be off, the processing sequence returns to other activity. If the bit should be found on then the processing proceeds to determine the delay value for the next event as a number of counts of the counter-register 37. This count is placed on data path 17 and gated to counter 37 by AND 38 upon the occurrence of a load count signal.

The counter-register 37 is actually a counter with gating that appears to the data path 17 as a register but is incremented by the output of divide by six counter 42. When the processor finds the next event sense bit in register 33 to be on, an instruction cycle is initiated which causes the next event count to be added to the then resident count in counter-register 37 and the result stored in counter-register 37.

Figure 3:
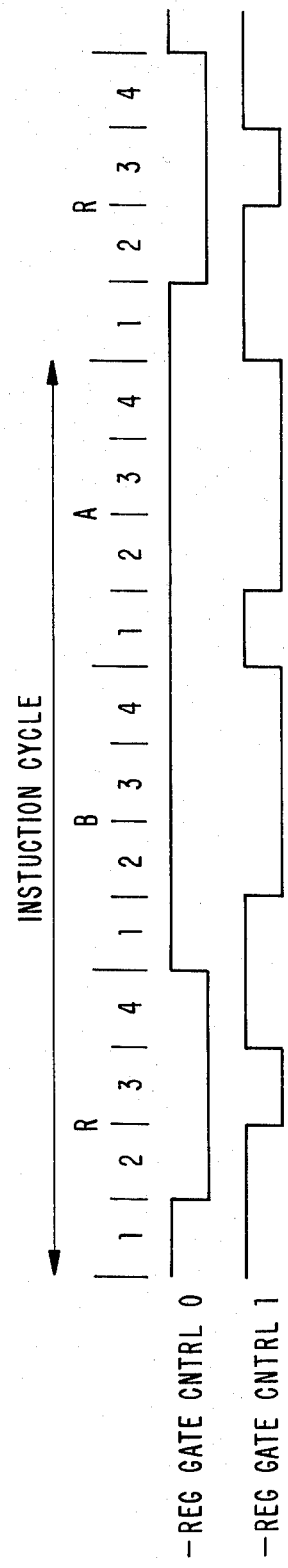
FIG. 3 is a timing diagram of principal control signals relative to the processor instruction cycle.

As shown in FIG. 3, the instruction cycle is partitioned into R, B and A times with each of these partitions having four divisions representative of the basic output of the oscillator which serves as the system clock. During an instruction cycle the ALU 18 B register 20 is loaded during B time, the A register 19 is loaded during A time and the result is stored back into the register from which the A register was loaded during R time. When the processor finds the next event sense bit in the register 33 to be on, the next event time interval is accessed from the data store memory and loaded in the ALU B register 20 during instruction cycle B time; the counter-register 37 is accessed and the value loaded into ALU A register 19 during instruction cycle A time and the result of the addition is stored back into counter-register 37 during instruction cycle R time. Referring to FIG. 3, the instruction pulse that increments the divide by six counter 42 is the −REG GATE CNTL 0 positive going pulse which occurs at the end of R4 time. The effective incrementing of both the divide by six counter 42 and the counter-register 37 on the occasion of every sixth instruction cycle occurs during B1 time. The instruction cycle which adds the next event count to the content of counter-register 37 is initiated after B1 time (with the counter-register 37 read access occurring during A time) and is completed when the ALU result is read into counter-register 37 starting with the positive going signal of, −REG GATE CNTL 1 at the end of R3 time. Thus any clock signal from counter 42 which increments counter-register 37 would occur prior to or subsequent to the instruction cycle whereby the new or next event delay is added to the current content of the counter.

Also, a next event is gated by AND 39 from data path 17 to the next event register 40. Although register 40 is connected to an 8 bit data path, only the 4 bit positions necessary to a particular operation such as the activating of 4 windings of a bifilar wound stepper motor are illustrated. In various applications other numbers of the 8 bits including the entire 8 bit register may be utilized. When the counter 37 and the next event register have been loaded the next event sense bit in register 33 is turned off and the processing sequence returns to other processing activity.

The counter 37 is continuously running with the pulses being counted being a function of the processing unit instruction cycle time. As shown the instruction cycles are supplied on line 41 to divide by six counter 42 so that the pulses that increment or decrement the counter 37 are six times the period of an instruction cycle. As an example, used in conjunction with a 5.33 microsecond cycle time processor the interval between pulses received by counter 37 is 32 microseconds. Accordingly counter 37 may provide time delays in multiples of 1 to 256 times the 32 microsecond period. It will be appreciated that the counter 37 runs continuously as a function of the output of the processing unit clock or oscillator. Although the next event timing associated with the counter 37 is synchronous with regard to the processing unit instruction cycle, the processor and next event timing circuit are otherwise asynchronous with regard to one another.

When counter 37 reaches a value or condition where the output of the 8 bit positions satisfy the inputs to AND 43 an output occurs on line 35. The signal on line 35 causes ANDs 44 to gate the contents of bits 0 through 3 of the next event register 40 respectively to bit positions 0 through 3 of current event register 45, while this signal is also directed to I/O sense and status register 33 to set the next event sense bit on. The device connected to data path 46 is thereupon controlled in accordance with the content of register 45.

In operation, with counter 37 being incremented by the output of the divide by six counter 42 and the AND 43 being satisfied by the occurrence of an all 1s input condition, the count which is loaded into the counter 37 by addition to the value therein is in fact the compliment of the delay count. For example if the next time period is to be a delay which is 50 times the pulse rate applied the counter 37, a value of 206 is added to the value in the counter at any time prior to the value in the counter which runs from 0 (all 0s) to 255 (all 1s) reaching the count of 49.

In the input from divide by six counter 42 were used to decrement the counter 37 and AND 43 was satisfied by an all 0 input, the actual count representative of the time delay would be entered into counter 37. If in such condition AND 43 is satisfied by all 1s the count entered in counter 37 would be the desired delay count less 1 so that the output of AND 43 would occur when the counter 37 output became all 1s one count following the counter overflowing the all 0 condition. Accordingly, the output on line 35 can occur at any fixed value of counter 37 by inserting inverters in selected input lines to AND 43 or modifying the value added to counter 37 when AND 38 is gated by the load count signal or by a combination thereof.

While the invention has been particularly described with reference to a preferred embodiment thereof, it will be understood by those skilled in the art that various changes in form and detail may be made therein without departing from the spirit and scope of the invention.

What is claimed is:

1. An information handling system including a source of successive clock pulses and a plurality of logic circuits responsive to said clock pulses, for performing a sequence of operations comprising;
    a continuously running delay counter;
    connecting means for connecting said continuously running counter to said source of clock pulses and providing said continuously running delay counter an uninterrupted sequence of pulses during successive cycles of operation of said continuously running delay counter;
    gate means connected to said delay counter and operable to generate an output signal to said plurality of logic circuits when said delay counter attains a predetermined fixed value; and
    means for adding the next event delay count to said delay counter between said successive clock pulses received by said counter subsequent to the previous output signal at any time prior to the expiration of the next event delay,
    whereby the occurrence of each event is timed from the occurrence of the next preceding event.

2. The information handling system of claim 1;
wherein said plurality of logic circuits comprise;
next event register means for holding a command for a controlled device;
current event register means for providing commands to a controlled device; and
switching means connected to the output signal from said gate means for gating the content of said next event register means to said current event register means in response to said output signal.

3. The information handling system of claim 1;
wherein said delay counter is a binary counter and further comprising;
means connected to said delay counter for incrementing said counter in response to the receipt of each of said clock pulses, and
said means for adding the next delay count to said delay counter comprises the addition of the compliment of the selected delay count with respect to the filled content of the delay counter to the then existing content of the counter, and
said gate means comprises a circuit for decoding an all 1s condition of said binary delay counter.

4. The information handling system of claim 3 further comprising;
a processing unit including instruction cycles as a recurring uniform time period, and
circuit means which generates said clock pulses, that are connected to increment said binary delay counter, as a function of said instructions cycles.

5. The information handling system of claim 4;
wherein said plurality of logic circuits comprise;
next event register means for holding a command for a controlled device;
current event register means for providing commands to a controlled device; and
switching means connected to the output signal from said gate means for gating the content of said next event register means to said current event register means in response to said output signal.

6. The information handling system of claim 1;
wherein said delay counter is a binary counter and further comprising;
means connected to said delay counter for decrementing said counter in response to the receipt of each of said clock pulses;
said means for adding the next delay count to said delay counter comprises the algebraic addition of the selected delay count to the then existing content of the delay counter, and
said gate means comprises a circuit for decoding an all zeros condition of said binary delay counter.

7. The information handling system of claim 6 further comprising;
a processing unit including instruction cycles as a uniformly recurring series of time periods, and
circuit means which generates said clock pulses connected to decrement said binary delay counter as a function of said instruction cycles.

8. The information handling system of claim 7;
wherein said plurality of logic circuits comprise;
next event register means for holding a command for a controlled device;
current event register means for providing commands to a controlled device; and
switching means connected to the output signal from said gate means for gating the content of said next event register means to said current event register means in response to said output signal.

* * * * *